UNITED STATES PATENT OFFICE.

FRANK E. COOMBS, OF SAN FRANCISCO, CALIFORNIA.

SULFITE-WASTE-LIQUOR PREPARATION AND PROCESS OF MAKING THE SAME.

1,327,862.  Specification of Letters Patent.  Patented Jan. 13, 1920.

No Drawing.  Application filed September 12, 1919. Serial No. 323,390.

*To all whom it may concern:*

Be it known that I, FRANK E. COOMBS, a citizen of the United States, residing at San Francisco, in the county of San Francisco and State of California, have invented certain new and useful Improvements in Sulfite-Waste-Liquor Preparations and Processes of Making the Same, of which the following is a specification.

This invention relates to sulfite waste liquor preparations and processes of making the same; and it comprises a highly reduced sulfite waste liquor preparation capable of various uses and in particular as a dye material dyeing wool, silk and other animal fibers directly with production of various brownish colors and hues; said material also being capable of dyeing cotton and other vegetable fibers with the production of various brownish colors and hues; said reduced sulfite waste liquor material usually containing a metal having colored oxids; and it also comprises a method of making such a material wherein a sulfite waste liquor preparation, which may be a neutralized and concentrated waste sulfite liquor, is reduced by the action of a finely divided metal, such metal being usually iron and the reduction being usually but not necessarily performed after acidification with a convenient mineral or organic acid, such as sulfuric acid or acetic acid; and the amount of metal and circumstances being such as to effect a far going reduction of sulfur-containing organic bodies present; all as more fully hereinafter set forth and as claimed.

In the sulfite process of making pulp wherein wood is digested with a solution of acid sulfite of lime or acid sulfite of magnesia, about half the wood unites with the sulfite radical and goes into solution in the form of new complex sulfur-containing organic bodies. Little is known as to the constitution of these organic bodies save that they are probably, at least in great part, sulfonic acids and that they contain groups of the aromatic or cyclic series. For the sake of convenience, the dissolved organic matters are frequently called lignosulfonates; the lignosulfonate of lime or the lignosulfonate of magnesia, as the case may be, and this name may be here used. Practically all the sulfur of the waste liquor is in organically combined form, not more than traces, in the usual American liquors, of the original sulfurous acid remaining as such or as a sulfite. Raw liquor from the digester rarely contains more than about 0.07 or 0.08 per cent. of $SO_2$ as sulfurous acid or as sulfite. The waste sulfite liquor, as the effluent from the digester is known, can be concentrated to a thick viscous liquor, usually about 30° Baumé, which is a commercial article, being used as an adhesive, for binding road materials, for tanning, etc. While it is a tanning agent, it has no dyeing power; and indeed it is not taken up from solution to any extent by wool and the like in a way which would prevent its removal from the fiber by water. As it usually occurs, it is a brownish liquid; its hue being dull and unattractive.

I have found that by subjecting sulfite liquor to the action of nascent hydrogen to an extent sufficient to produce substantial reduction of the organic bodies present, I can produce new bodies which have dyeing effects, producing on cotton and wool desirable dyeing effects; shades of a more or less brownish hue. The best mode of applying my invention involves the use of iron for furnishing the nascent hydrogen; the iron going into solution and forming compounds having good dyeing properties. In the presence of the iron, the tendency toward the formation of brownish shades is accentuated. Lighter shades may be attained by using other metals having colorless oxids, such as zinc, tin, etc.

The dyestuffs made in the described manner can be used to produce desirable khaki shades on wool and other fibers and textile materials.

Reduction may be effected either cold or hot. The reducing action is accelerated by the presence of an acid but the same action goes on, albeit more slowly, without the addition of the acid. Some of the commercial concentrated waste sulfite liquor preparations are sufficiently acid in themselves. While in the reduction operation I may use the dilute sulfite waste liquor solution as it comes from the evaporator, dyeing directly with the reduced product, I ordinarily find it better to make a more concentrated preparation which can be diluted as required in making dye baths. In making such a preparation, either the concentrated commercial preparations may be treated by the reducing agent or the original dilute solution may be reduced and then evaporated to the desired concentration.

The reduction may be carried on until no further action of the hydrogen is observed, or it may be stopped short of that point. Ordinarily I carry the reduction to the end.

In a specific embodiment of the present invention, a commercial neutral waste sulfite liquor of 30° Baumé is acidified with 1 or 2 per cent. of sulfuric acid and iron filings or iron wire added. In order to hasten the action, a little copper may be added to form a couple. Copper itself may be used and gives a slow reduction. Where copper is to be used and is to form a component of the resulting dyestuff, it is ordinarily better to accelerate the reaction by connecting the copper to a source of suitable current; that is, to perform the reduction electrolytically. After the reduction has gone to the stage desired, the liquid is removed from the undissolved iron and iron salts. It may then be used directly for dyeing or it may be further concentrated if it is desired to store or ship it. In using it directly, it may be, and customarily is, somewhat diluted. In using the original waste sulfite liquor the operation is exactly the same save that after the reduction, unless the reduced liquid is to be directly used for dyeing, I ordinarily evaporate to some convenient density, say 20-30° Baumé. Evaporation may be carried so far as to make dry products.

For coloring scoured white wool to a desirable shade of greenish brown, similar to those used in some khaki goods, a dye bath may be prepared from the concentrated material by solution or dilution with water. In using material of about 30° Baumé, enough water is usually added to bring the mixture to about 12-15° Baumé. The bath is brought to about the boiling point and the wool immersed for from one-half to about 2 or 3 hours. Simple rinsing with clean water will leave the wool properly and uniformly colored or dyed in a dark shade of greenish brown. Mordants may be used on the wool before exposure to the bath for the purpose of producing different shades and hues. Alumina, iron oxid, chromium oxid, etc., may be used. The present dyestuff may be used to give wool and the like a preliminary dyeing and then the goods further vatted with logwood or other extracts or dyestuffs. The use of the dyestuff of the present invention for a first dyeing favorably modifies many of these colors.

In reducing sulfite liquor, the new bodies formed have apparently considerable insecticidal virtue. Usually if the reduction is carried to a considerable extent there is a production of sulfids and of free sulfur. The presence of the sulfur and of the sulfids add to the insecticidal properties. Material made with fine iron as a reducing agent is particularly applicable as an insecticide. It may be used with the usual spraying apparatus against both sucking and non-sucking insects. It is also useful against the various parasitic molds and mildews. For this purpose it may be compounded with other spraying agents. Having much the physical properties of the original sulfite liquor it adheres well to leaves, vines, etc., and to insects. The composition being very cheap it may also be used for road surfacing. Used in road surfacing it again reoxidizes and produces a good binding action.

What I claim is:—

1. As a new material sulfite liquor having its organic constituents reduced.

2. As a new material a material comprising reduced sulfite waste liquor and containing iron.

3. A process of making dyestuffs and which comprises exposing a sulfite waste liquor preparation to the action of nascent hydrogen to an extent sufficient to produce fargoing reduction of organic bodies present.

4. A process of making dyestuffs and which comprises exposing a sulfite waste liquor preparation to the simultaneous action of nascent hydrogen and iron to an extent sufficient to produce fargoing reduction of organic bodies present.

5. A process of making dyestuffs and which comprises exposing acidified sulfite waste liquor to the simultaneous action of nascent hydrogen and iron to an extent sufficient to produce fargoing reduction of organic bodies present.

In testimony whereof, I affix my signature hereto.

FRANK E. COOMBS.